3,733,209
CULINARY MIX FOR THE PREPARATION OF BAKED GOODS WITH IMPROVED MILK CHOCOLATE FLAVOR
Monoj K. Gupta, Cincinnati, and William M. James, Symmes Township, Hamilton County, Ohio, assignors to The Procter & Gamble Company, Cincinnati, Ohio
No Drawing. Filed Oct. 6, 1970, Ser. No. 78,616
Int. Cl. A21d 2/00; A23l 1/10
U.S. Cl. 99—94                                    6 Claims

ABSTRACT OF THE DISCLOSURE

A prepared culinary mix for the preparation of milk chocolate flavored baked goods which includes sugar, flour, shortening, and other minor ingredients, and to which is added small amounts of non-fat dry milk solids or whey solids, cocoa, and either lactose, maltose, raffinose or galactose. The baked goods made from the above-mentioned culinary mix exhibit a desirable milk chocolate type flavor.

BACKGROUND OF THE INVENTION

Prepared culinary mixes for baking can be of the "dry mix" variety or can consist of a dry mix and a liquid "flavor packet." So-called "dry" prepared mixes used for baking are made by combining sugar, flour, shortening, and other ingredients including leavening, milk solids, egg solids, flavoring, and coloring, to form a free-flowing granular mixture. To prepare these dry mixes for baking, liquid materials such as water, milk, and eggs are added and the combination is beaten to form a homogeneous mixture and incorporate air. The resulting batter is then baked. The "flavor packet" mixes are prepared in the same manner except that the shortening and flavoring may be in liquid form in the packet and are added to the dry mix part at the same time the water, milk, and eggs are added. The present invention relates to a prepared mix which provides a desirable milk chocolate type flavor in baked goods.

It has proved difficult to generate a desirable milk chocolate type flavor into prepared mixes for baking. A milk chocolate type flavor can be obtained by adding milk chocolate to the mix but it must be put into a granular form and the process for putting milk chocolate into a granular form is costly and time-consuming. Attempts have been made to produce a milk chocolate type flavor in prepared mixes using cocoa without adding milk chocolate, but a desirable milk chocolate type flavor has not been obtained in prepared mix baking compositions. Bedenk, U.S. Pats. 2,874,052 and 2,037,864, shows dry mix compositions which have a chocolate flavor and Rusoff, U.S. Pat. 2,835,592, shows an artificial chocolate flavor component which can be used to improve the flavor of natural chocolate products. They do not relate to milk chocolate type flavor, however.

SUMMARY OF THE INVENTION

Briefly stated, this invention relates to the discovery of novel prepared mixes which yield baked goods having an unexpectedly desirable milk chocolate type flavor which is very similar or substantially identical to the flavor of milk chocolate, but without adding milk chocolate. The baked goods of the present invention have a milk chocolate type flavor of a quality that was unobtainable prior to this invention without the use of milk chocolate.

The mixes of the present invention are characterized by the presence of three flavoring components. The flavoring components are present in the following amounts, based on the weight of the total mix: 0.25 to 1.5% of a saccharide selected from the group consisting of lactose, maltose, raffinose, and galactose, 0.25 to 2% of non-fat dry milk or whey solids (as a protein source), and 2 to 12% cocoa. When the above-described mix is baked, the final product has a desirable milk chocolate type flavor. The preferred range for cocoa is 5 to 9% of the total mix. Lactose is preferred because it is readily commercially available. If less than 0.25% saccharide, 0.25% of the protein source, or 2% cocoa is present, the milk chocolate flavor will be too weak. If more than 1.5% saccharide or 12% cocoa is present, the cocoa or chocolate flavor will be too strong. If more than 2% of the protein source is present, the flavor becomes undesirable, and, in cakes, the texture of the baked product will be too tender and soft.

GENERIC RECIPE

| Ingredients: | Percent by weight |
|---|---|
| Flour | 20–40 |
| Sugar | 30–75 |
| Shortening | 4–20 |
| Leavening soda | 0.005–3 |
| Leavening acid | 0–1.5 |
| Cocoa | 2–12 |
| Non-fat dry milk solids or whey solids | 0.25–2 |
| Lactose, maltose, raffinose, or galactose | 0.25–1.5 |
| Salt | 0–2 |
| Flavoring, coloring, water binders | Optional |

DETAILED DESCRIPTION OF THE INVENTION

Preferred embodiments of the prepared mix composition of this invention reside in specific formulas for milk chocolate type flavored cakes and brownies, as follows:

DRY PREPARED MIX FOR MILK CHOCOLATE FLAVOR TYPE CAKES

| Ingredients: | Percent by weight |
|---|---|
| Flour | 30–40 |
| Sugar | 30–45 |
| Shortening, preferably containing emulsifiers and high temperature batter stabilizers | 9–15 |
| Leavening soda | 1.5–3 |
| Leavening acid | 0.2–1.5 |
| Lactose | 0.25–1.5 |
| Cocoa | 2–12 |
| Non-fat dry milk solids | 0.25–2 |
| Salt | 0–2 |
| Flavoring, coloring, water binders | Optional |

PREPARED MIX FOR BROWNIES

| Ingredients: | Percent by weight |
|---|---|
| Sugar | 45–75 |
| Flour | 20–30 |
| Shortening, preferably containing emulsifier and high temperature stabilizers | 4–20 |
| Cocoa | 2–12 |
| Leavening soda | 0.005–1 |
| Leavening acid | 0–0.05 |
| Lactose | 0.25–1.5 |
| Non-fat dry milk solids | 0.25–2 |
| Flavoring, coloring, salt | Optional |

The sugar can be sucrose or mixtures of sucrose with dextrose or fructose in granular form. The sugar can also be in powder form. Sucrose is the preferred sugar for use herein.

The flour can be soft or hard wheat flour. Small proportions, e.g., up to about 10%, of the flour can be of the high protein variety and/or starch.

Shortenings which can be employed in the prepared mixes of this invention include solid or plastic as well as liquid or semi-fluid glyceride shortenings derived from animal, vegetable or marine fats and oils, including synthetically prepared shortenings. Any shortening normally used in baked goods can be used.

The glycerides suitable for use in the shortening can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low temperature interesterification reactions of fatty triglyceride-containing oils and fats, such as interesterified or rearranged cottonseed oil and lard; and they can be otherwise formed by various organic syntheses.

The shortening can contain an alpha-phase crystal emulsifier and a high temperature batter stabilizer. A preferred amount of alpha-phase crystal-tending emulsifiers is within the range of 8%–16% in cakes and 2%–6% in brownies. A preferred amount of high temperature batter stabilizers is within the range of from 0.1%–4% for the milk chocolate flavored cake and brownie mixes.

Alpha-phase crystal-tending emulsifiers can be both lipophilic and hydrophilic and can contain in the molecule at least one free unesterified hydroxyl group. Said emulsifiers are characterized by their tendency to crystallize in an alpha-phase rather than a beta-or beta-prime phase. These types of polymorphic crystalline structures can be identified by their X-ray diffraction patterns and are described in U.S. Patents 2,521,241–2, granted to Mitchell, Sept. 5, 1950. The alpha-phase crystalline form is the least stable, least dense, and lowest melting of these crystalline forms. Some specific examples are propylene glycol monostearate; 1,3-propanediol monostearate; 1,4-butanediol monostearate; 1,3-butanediol monostearate; 1,5-pentanediol monostearate; and the corresponding esters of the above-named diols with myristic acid, palmitic acid, arachidic acid, and behenic acid. There is more detailed discussion of suitable alpha-phase crystalline emulsifiers in commonly-assigned, co-pending application "Cake Mixes for Preparing Large, Delectable Cakes," Arlee A. Andre, Ser. No. 623,212, filed Mar. 15, 1967, which is incorporated herein by reference.

High temperature batter stabilizers which can be used in the shortening component of the dry prepared mixes of this invention are set forth, by way of example, as follows:

(a) The saturated fatty acids containing from about 14 to about 22 carbon atoms. A perferred high temperature batter stabilizer within this class is stearic acid.

(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from 3 to 5 carbon atoms and said saturated fatty acid having from about 14 to 22 carbon atoms, with a polycarboxylic acid containing from about 3 to 6 carbon atoms and having from 0 to 4 hydroxy groups, said condensation product having at least one free carboxyl group per molecule. An example of a preferred high temperature batter stabilizer within this class is stearoyl propylene glycol hydrogen succinate.

(c) The condensation product of a saturated fatty acid containing from about 14 to about 22 carbon atoms with a hydroxy polycarboxylic acid containing from 3 to 6 carbon atoms and having from 1 to 4 hydroxy groups, said condensation product having at least one free carboxyl group per molecule;

(d) The condensation product of a saturated straight chain fatty alcohol having from about 14 to about 22 carbon atoms with a dicarboxylic acid containing 3 to 6 carbon atoms and having no hydroxy groups, said condensation product having at least one free carboxyl group per molecule;

(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from 3 to 6 carbon atoms and having from 1 to 4 hydroxy groups and said fatty alcohol having from about 14 to about 22 carbon atoms;

(f) The hydrogenated vegetable phosphatides having iodine values of less than about 30; and (g) The hydroxylated vegetable phosphatides.

The preferred shortenings for cake mixes have solids content index values (SCI) [1] ranging from 10 to 40 at 70° F., 10 to 30 at 80° F., 5 to 20 at 92° F., and 0.5 to 10 at 105° F., and have a solids content index value spread between 70° F., and 92° F. of at least 8 SCI units. These shortenings comprise by weight from 67% to 94% of basestock component consisting essentially of a triglyceride constituent, the triglyceride constituent having SCI values ranging from 10 to 40 at 70° F., 5 to 35 at 80° F., 0 to 25 at 92° F., and .5 to 10 at 105° F.; from 1% to 8% triglyceride hardstock component having an iodine value (IV) less than 10; and from 5% to 25% particular emulsifier component. The emulsifier component consists essentially by weight of from 50% to 100% monoester of propylene glycol with saturated fatty acid having from 12 to 22 carbon atoms in each of the fatty acid chains and from 0 to 50% of fatty monoglyceride having saturated fatty acid ester chains and from 12 to 22 carbon atoms in each of these fatty acid ester chains. The monoester of propylene glycol has at least 60 weight percent of its fatty acid ester chains expressed as acids either derived from stearic acid or from palmitic acid with the weight ratio of stearic acid ester chains (expressed as acids) to palmitic acid ester chains (expressed as acids) ranging from 1:1 to 2.5:1. These shortenings are fully described in co-pending commonly assigned application, "Emulsifier-Containing Shortenings and Cake Mixes Containing the Same" Ser. No. 876,114, filed Nov. 12, 1969, which is incorporated herein by reference.

The prepared mixes of this invention contain leavening soda. The minimum amount of leavening soda is important. Too little leavening soda provides insufficient leavening to sustain the increased size of the cakes or brownies prepared from the mixes of this invention and thus results in improperly-formed and/or low volume baked goods. A preferred amount of leavening soda is within the range of from 1.5%–3.0% for the milk chocolate cake mixes and from 0.005–0.05% for brownies. Suitable leavening sodas are sodium, potassium or ammonium bicarbonate.

The dry prepared cake mixes of this invention can contain a leavening acid. The leavening acid can be a conventional agent, such as monocalcium phosphate, or a slow-acting agent such as sodium aluminum phosphate, dicalcium phosphate, or gluconodeltalactone. A preferred amount of leavening acid for use in cakes is 0.2 to 1.5%. Leavening acid can be used in brownies in the range of 0–0.05%.

For many mixes it is accepted practice for the housewife to add the required amount of eggs to the prepared

---

[1] SCI values are measured herein by the dilatometric method of Fulton, Lutton, and Willie, T. A. O.C. S. 31, 98 (2954). They are a measure of the amount of solids present in the shortening at a particular temperature.

culinary mix in the course of batter preparation and this practice can be followed with the mixes of the invention. If desired, the inclusion of egg solids in the mix is an allowable alternative. The function and permissible variations in the remaining ingredients are apparent to those skilled in the art. For example, various amounts of ingredients such as colors, water binders, flavors (such as vanilla and maltol), a hydrophilic colloid such as carboxymethyl cellulose, salt and the like can be added if desired. Suitable water binders can include natural gum materials such as guar gum, gum tragacanth, locust bean gum, algin, gelatin, Irish Moss, pectin, and gum arabic. Synthetic binder materials such as water-soluble salts of carboxymethylcellulose can also be used.

As was pointed out above, the desirable milk chocolate type flavor of the present invention is unexpectedly produced by the presence of, based on the weight of the total mix, 0.25 to 1.5% of a saccharide selected from the group consisting of lactose, maltose, raffinose, and galactose, 0.25 to 2% of non-fat dry milk solids or whey solids (as a protein source), and 2 to 12% cocoa in the prepared culinary mix. The preferred range for cocoa is 5 to 9% by weight of dry mix. Lactose is preferred because it is readily commercially available.

If less than 0.25% of the saccharide, 0.25% nonfat dry milk or whey solids, or 2% cocoa is present, the milk chocolate flavor will be too weak. If more than 1.5% saccharide or 12% cocoa is present, the cocoa or chocolate flavor will be too strong. If more than 2% non-fat dry milk or whey solids is present, the flavor becomes undesirable, and, in cakes, the texture of the baked product becomes too tender and soft.

It is theorized that the milk chocolate type flavor of this invention is generated in a Millard reaction. This reaction requires a reducing sugar and amino group (from the protein source). A reaction mechanism has been proposed by Hodge et al. [References: (a) J. Agr. Food Chem. 1, 928 (1953), (b) Ibid, 17, 723 (1969)]:

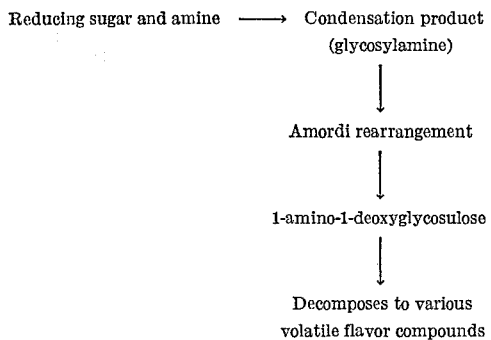

The above theory is not intended to limit this invention in any way.

The dry prepared cake mixes of this invention are conveniently prepared, for example, by blending sugar, flour, and shortening into a homogeneous premix in a paddle mixer, and then passing this premix through a 4-roll mill. The remaining ingredients, including the saccharide, protein source, and cocoa, can then be added. This combination can be mixed in a paddle mixer or ribbon mixer and then passed through an entoleter to form a smooth, free-flowing finished mix. This method of preparing a dry prepared mix is disclosed in U.S. Patents 2,874,051–053. Another preferred method of preparing these dry prepared mixes is disclosed in Cooke, U.S. patent application Ser. No. 759,795, filed Sept. 13, 1968.

The mixes are conveniently prepared into cakes by forming a batter by mixing the dry mix in a household electric mixer, for example, for 2 minutes at medium or high speed, after having added water or other aqueous liquid and eggs or egg whites to the mix. The batter resulting from the mixing process is poured into a cake pan and baked, for example, for 25 to 40 minutes at 350° F. to 425° F.

The dry brownie mix is prepared by creaming sugar and shortening in a paddle mixer or a ribbon blender. Flour and the other ingredients including reducing sugar, milk, solids and cocoa are added to the prepared sugar-shortening cream and mixed thoroughly either in a paddle mixer or in a ribbon blender. The finished mix can be passed through an entoleter. In case the flavor packet variety is used, the liquid shortening and the cocoa are placed in the packet.

The brownies can be conveniently prepared by forming a batter in a similar manner as it is done in the case of cake mixes. If the flavor packet variety is used, the contents of the flavor packet are mixed into the batter simultaneously with the dry part. The resulting batter is then baked from 30–45 minutes at 350° F.–425° F.

The practice of this invention is shown by the following examples, which are meant only to illustrate the invention and not to limit it in any way.

Example I.—Cake

A milk chocolate type flavored cake mix is prepared by the method as previously described by using the following formula:

| Ingredients: | Percent by weight |
|---|---|
| Sugar (sucrose) | 35.734 |
| Soft wheat flour | 32.485 |
| Shortening [1] | 11.00 |
| Dextrose | 4.50 |
| Sodium bicarbonate | 2.60 |
| Sodium aluminum phosphate | 0.35 |
| Monocalcium phosphate | 0.15 |
| Salt (NaCl) | 1.0 |
| Modified starch | 0.40 |
| Non-fat dried milk solids | 0.50 |
| Pregelatinized corn starch | 1.00 |
| High protein wheat flour | 1.50 |
| Wheat starch | 2.00 |
| Guar gum | 0.20 |
| Lactose | 0.50 |
| Cocoa | 6.0 |
| Maltol and vanillin | 0.081 |
| Total | 100.000 |

[1] 28.34% soybean oil having an SCI of 11 at 70° F., 47.26% of soybean oil having an SCI of 44 to 70° F., 2.90% cottonseed stearin having an iodine value of 8, 17.00% crude propylene glycol monoester derived from palm oil hydrogenated to an iodine value of 3, 4.5% of crude rapeseed oil monoglyceride hydrogenated to an iodine value of 8.

The batter is prepared by adding two whole eggs and 1⅓ cups of water to 18.7 ounces (531 gms.) of mix. The batter is then mixed utilizing a conventional household electric mixer for 2 minutes at medium speed (450 r.p.m. under load). 463 gms. of batter is then poured into an 8-inch round cake pan and baked at 350° F. for 32 minutes. After cooling for 30 seconds, the counter height and the edge height of the cake are measured. The cake has a distinctly pleasing milk chocolate type flavor. This dry mix produces cakes with the distinct milk chocolate type flavor character even after 3 months storage at 100° F. Maltose, raffinose, or galactose can be used in place of lactose. Whey solids can be used instead of non-fat dry milk solids.

Example II.—Brownie (flavor packet)

The brownie mix used in this example is composed of two parts:

(a) a dry mix packet containing all dry ingredients
(b) a flavor packet containing a liquid shortening, cocoa and artificial flavoring.

The compositions of the dry mix and the flavor packets are shown below:

(A) DRY MIX

| Ingredients: | Percent by weight |
|---|---|
| Sugar (sucrose) | 59.025 |
| Hard wheat flour | 26.420 |
| Shortening containing monoglyceride and freshness preserver [1] | 6.230 |
| Medium fat natural process cocoa | 5.940 |
| Salt (NaCl) | 0.890 |
| Leavening soda | 0.020 |
| Non-fat dried milk solids | 1.000 |
| Lactose | 0.375 |
| Vanillin | 0.100 |
| Total | 100.000 |

[1] 94.08% soybean oil hydrogenated to an iodine value of 107, 1.92% soybean oil hydrogenated to an iodine value of 8, 4.0% of soybean oil monoglyceride hydrogenated to an iodine value of 8; and the freshness preserver is butylated hydroxylanisole, 31 parts per million extra and butylated hydroxytoluene, 39 parts per million extra.

(B) FLAVOR PACKET

| Ingredients: | Percent by weight |
|---|---|
| Liquid shortening [1] | 79.9 |
| Cocoa | 20.0 |
| Vanillin | 0.1 |
| Total | 100.00 |

[1] 91.01% soybean oil hydrogenated to an iodine value of 107, 4.99% soybean oil hydrogenated to an iodine value of 8, 4.0% of soybean oil monoglyceride hydrogenated to an iodine value of 8; and the freshness preservers are butylated hydroxyl anisol, 31 parts per million extra and butylated hydroxytoluene, 39 parts per million extra.

The dry mix preparation has been described earlier in this application. The flavor packet is prepared by mixing all the ingredients in a paddle type, shear type, or impeller agitated type mixer. The density and the viscosity of the finished packet material are controlled to control the consistency of the packet material. (See U.S. Pat. No. 3,433,649, Mar. 18, 1969.)

The batter is prepared by mixing 20.5 ounces of the dry mix with 3.7 ounces of flavor packet material plus 3 whole eggs and ⅛ cup of water in a bowl using a conventional household electric mixer for 15 seconds at low speed (225 r.p.m. under load). The batter is then baked in a conventional household baking pan (9″ x 13″) for 28 minutes at 350° F. Maltose, raffinose, or galactose can be used in non-fat dry milk solids.

Example III.—Brownie (dry mix)

The dry brownie mix to be used in this example contains the following ingredients:

| Ingredients: | Percent by weight |
|---|---|
| Sugar (sucrose) | 50.000 |
| Hard wheat flour | 22.280 |
| Shortening [1] | 17.480 |
| Cocoa | 8.080 |
| Salt | 0.744 |
| Leavening soda | 0.017 |
| Non-fat dried milk solids | 0.847 |
| Lactose | 0.318 |
| Vanillin | 0.234 |
| Total | 100.000 |

[1] 94.8% soybean oil hydrogenated to an iodine value of 107, 1.92% soybean oil hydrogenated to an iodine value of 8, 4.0% of soybean oil monoglyceride hydrogenated to an iodine value of 8; and the freshness preserver is butylated hydroxyl, anisole, 31 parts per million extra and butylated hydroxytoluene 39 parts per million extra.

The batter is prepared by mixing 24.2 ounces of the dry mix with 3 whole eggs and ⅛ cup of water in a bowl and then proceeding in the same manner as in Example II. Lactose, maltose, raffinose, and galactose can be used in place of lactose. Whey solids can be used instead of non-fat dry milk solids.

The above examples show that the presence of the three flavoring components in dry prepared culinary mixes for the preparation of baked goods, within the specified ranges, unexpectedly produces a desirable milk chocolate type flavor in the baked goods which are prepared from these mixes. The utilization of these elements in the recited proportions is the key feature in the production of the highly desirable milk chocolate type flavor.

What is claimed is:

1. A prepared culinary mix for the preparation of milk chocolate flavored baked goods which comprises flour, from about 30% to about 75% sugar, shortening, not less than about .005% leavening soda, and based on the weight of the total mix, 0.25 to 1.5% of a saccharide selected from the group consisting of lactose, maltose, raffinose, and galactose, 0.25 to 2% of a protein source selected from the group consisting of non-fat dry milk solids and whey solids, and 2 to 12% cocoa.

2. The prepared culinary mix of claim 1 wherein the amount of cocoa used is 5 to 9% based on the weight of the total mix, the saccharide is lactose, and the protein source is non-fat dry milk solids.

3. A dry prepared culinary mix for the preparation of milk chocolate flavored cakes which comprises, based on the weight of dry mix, 30 to 40% flour, 30 to 45% sugar, 9 to 15% shortening, 1.5 to 3% leavening soda, 0.2 to 1.5% of a leavening acid, 0 to 2% salt, 0.25 to 1.5% saccharide selected from the group consisting of lactose, maltose, raffinose, and galactose, 0.25 to 2% protein source selected from the group consisting of non-fat dry milk solids and whey solids, and 2 to 12% cocoa.

4. The dry prepared culinary mix of claim 3 wherein the amount of cocoa used is 5 to 9% based on the weight of the dry mix, the saccharide is lactose, and the protein source is non-fat dry milk solids.

5. A prepared culinary mix for the preparation of milk chocolate flavored brownies which comprises, based on the weight of the total mix, 45–75% sugar, 20–30% flour, 4–20% shortening, 0.005–1% leavening soda, 0–0.05% leavening acid, 0.25 to 1.5% saccharide selected from the group consisting of lactose, maltose, raffinose, and galactose, 0.25 to 2% of a protein source selected from the group consisting of non-fat dry milk solids and whey solids, and 2 to 12% cocoa.

6. The prepared culinary mix of claim 5 wherein the amount of cocoa used is 5 to 9% based on the weight of the total mix, the saccharide is lactose, and the protein source is non-fat dry milk solids.

References Cited

UNITED STATES PATENTS

| 3,071,472 | 1/1963 | Hager et al. | 99—94 |
| 3,153,595 | 10/1964 | Tiedemann | 99—94 |
| 3,428,461 | 2/1969 | Hattoa et al. | 99—94 |

RAYMOND N. JONES, Primary Examiner